United States Patent
Chen

(10) Patent No.: US 11,962,837 B2
(45) Date of Patent: Apr. 16, 2024

(54) VIDEO UPDATE PUSH METHOD AND TERMINAL

(71) Applicant: Petal Cloud Technology Co., Ltd., Guangdong Province (CN)

(72) Inventor: Min Chen, Shenzhen (CN)

(73) Assignee: PETAL CLOUD TECHNOLOGY CO., LTD., Dongguan (CN)

( * ) Notice: Subject to any disclaimer, the term of this patent is extended or adjusted under 35 U.S.C. 154(b) by 0 days.

(21) Appl. No.: 17/630,340

(22) PCT Filed: Jul. 29, 2020

(86) PCT No.: PCT/CN2020/105490
§ 371 (c)(1),
(2) Date: Jan. 26, 2022

(87) PCT Pub. No.: WO2021/018186
PCT Pub. Date: Feb. 4, 2021

(65) Prior Publication Data
US 2022/0295138 A1  Sep. 15, 2022

(30) Foreign Application Priority Data
Aug. 1, 2019 (CN) .......................... 201910705589.8

(51) Int. Cl.
*H04N 21/431* (2011.01)
*H04N 21/81* (2011.01)
*H04N 21/84* (2011.01)

(52) U.S. Cl.
CPC ..... *H04N 21/4312* (2013.01); *H04N 21/8153* (2013.01); *H04N 21/8402* (2013.01)

(58) Field of Classification Search
None
See application file for complete search history.

(56) References Cited

U.S. PATENT DOCUMENTS

| | | | |
|---|---|---|---|
| 9,342,490 B1 | 5/2016 | Taylor et al. | |
| 11,233,895 B2* | 1/2022 | Urrutia Daglio | H04M 1/72427 |
| 2015/0312181 A1 | 10/2015 | Peterson et al. | |
| 2017/0024471 A1 | 1/2017 | Liu et al. | |
| 2017/0127102 A1* | 5/2017 | Yin | H04N 21/44222 |
| 2019/0289123 A1 | 9/2019 | Xu | |
| 2019/0342616 A1* | 11/2019 | Domm | G06Q 50/01 |
| 2022/0295138 A1 | 9/2022 | Chen | |

FOREIGN PATENT DOCUMENTS

| | | |
|---|---|---|
| CN | 101388736 A | 3/2009 |
| CN | 103391479 A | 11/2013 |
| CN | 103530024 A | 1/2014 |
| CN | 103647803 A | 3/2014 |
| CN | 103677865 A | 3/2014 |
| CN | 103873934 A | 6/2014 |
| CN | 105227972 A | 1/2016 |

(Continued)

*Primary Examiner* — Omar S Parra
(74) *Attorney, Agent, or Firm* — Conley Rose, P.C.

(57) ABSTRACT

A video update push method includes, after a video followed by a user has been updated, obtaining, by a terminal, a poster and video information of the updated video from a server; generating, by the terminal, a wallpaper based on the poster, where a first area on the wallpaper includes the video information; and displaying, by the terminal, the wallpaper.

20 Claims, 10 Drawing Sheets

(56) References Cited

FOREIGN PATENT DOCUMENTS

| | | |
|---|---|---|
| CN | 105635442 A | 6/2016 |
| CN | 105791352 A | 7/2016 |
| CN | 105847892 A | 8/2016 |
| CN | 105915954 A | 8/2016 |
| CN | 106648606 A | 5/2017 |
| CN | 107015806 A | 8/2017 |
| CN | 107509088 A | 12/2017 |
| CN | 110798701 A | 2/2020 |
| EP | 2525567 A2 | 11/2012 |
| WO | 2014005222 A1 | 1/2014 |
| WO | 2017156984 A1 | 9/2017 |

* cited by examiner

VIDEO UPDATE PUSH METHOD AND TERMINAL

CROSS-REFERENCE TO RELATED APPLICATIONS

This is a U.S. National Stage of International Patent Application No. PCT/CN2020/105490 filed on Jul. 29, 2020, which claims priority to Chinese Patent Application No. 201910705589.8 filed on Aug. 1, 2019. Both of the aforementioned applications are hereby incorporated by reference in their entireties.

TECHNICAL FIELD

Embodiments of this application relate to the field of communications, and in particular to a video update push method and a terminal.

BACKGROUND

Popularization of terminal devices and emergence of massive applications bring people better life experiences. Many video applications also emerge in the field of video watching, which are installed on a terminal device through which a user can watch television dramas, movies, live television programs, and the like.

At present, an update reminder mode for videos (including a television drama, a sporting event, a movie, and the like) of interest to a user is an intra-application notification mode, that is, each video application may display an updated video notification in a recommended area of a platform. However, if the user does not start this video application, a video update cannot be obtained in time. Therefore, how to implement a perfect video update push method becomes an urgent problem to be resolved.

SUMMARY

The embodiments of this application provide a video update push method and a terminal, which can implement a perfect video update push mode.

To achieve the foregoing objective, the following technical solutions are used in the embodiments of this application.

According to a first aspect, an embodiment of this application provides a video update push method. The video update push method includes: After a video followed by a user is updated, a terminal may obtain a poster and video information of an updated video from a server; the terminal may then generate a wallpaper based on the obtained poster, where a specific area on the wallpaper includes the video information; and the terminal displays the generated wallpaper.

In the foregoing manner, an improved video update push method is implemented. The terminal can implement pushing of a video update by using a wallpaper. This push manner has the following advantages: 1. High-lighting. The wallpaper is displayed on a screen of the terminal, and the user can see an update push on the wallpaper in time when using the terminal. 2. User experience is improved. In this embodiment of this application, the wallpaper changes with the video update, thereby enriching content of the wallpaper and effectively improving user visual experience.

In a possible implementation, if the video followed by the user is updated, the terminal may obtain the poster and the video information of the updated video after further determining that there is no watching record of the updated video by the user.

In the foregoing manner, pushing of an updated and unwatched video is implemented.

In a possible implementation, the video information includes at least one of the following: an episode number of the updated video, and a synopsis of the updated video. Optionally, the episode number refers to an episode sequence number of the updated video.

In the foregoing manner, an exposure entry of updated content is increased, to improve a probability of discovering the updated content by the user without occupying another information entry.

In a possible implementation, the terminal may obtain a plurality of posters from the server. Correspondingly, the step in which the terminal generates a wallpaper based on the poster may further include: The terminal generates a plurality of wallpapers based on the plurality of posters, where the plurality of posters correspond to the plurality of wallpapers one by one. Optionally, the plurality of posters belong to a same updated video. Optionally, the plurality of posters may alternatively belong to different updated videos.

In the foregoing manner, pushing of one or more updated videos is implemented.

In a possible implementation, if the terminal generates a plurality of wallpapers, a manner in which the terminal displays the wallpaper may include: dynamically displaying the plurality of wallpapers at a set time interval.

In the foregoing manner, the content of the wallpaper is enriched, and diversity of displayed content is improved.

In a possible implementation, the terminal may determine whether a preset display condition is met before displaying the wallpaper. Optionally, if it is determined that the preset display condition is met, the wallpaper is displayed. Otherwise, the wallpaper is not displayed.

In the foregoing manner, selectivity of wallpaper display timing is implemented.

In a possible implementation, the preset display condition may include at least one of the following: The screen of the terminal is locked, a preset time point is reached, or the terminal is in a standby mode.

Optionally, if the terminal enters a lock screen mode, the preset display condition is met, and the generated wallpaper may be displayed. Optionally, the preset time point may also be set. The time point may be set by the user, and the terminal displays the generated wallpaper at a triggering moment of the preset time point. Alternatively, when the terminal is not operated for a long time, the terminal enters the standby mode and may display generated wallpaper.

In a possible implementation, the poster of the updated video is related to the updated content.

In the foregoing manner, an exposure degree of the updated video is improved, so that the user can know a hot spot or the synopsis of the updated video while being aware of the video update. Accordingly, a quantity of views of the video is improved.

In a possible implementation, the method may further include: receiving an operation instruction of the user to the wallpaper, where the instruction is used to instruct to play the updated video; and jumping to a playback page of the updated video based on the instruction.

In the foregoing manner, a quick jump from the wallpaper to the playback page is implemented.

According to a second aspect, an embodiment of this application provides a terminal. The terminal includes a display, a memory, and a processor. The memory is coupled to the processor. The memory may include program instructions. When the program instructions are executed by the processor, the terminal is enabled to perform the following steps: obtaining a poster and video information of an updated video from a server after a video followed by a user is updated; generating a wallpaper based on the poster, where a specific area on the wallpaper includes the video information; and displaying the wallpaper.

In a possible implementation, before the obtaining a poster and video information of an updated video from a server, the program instructions may further enable the terminal to perform the following step: determining that there is no watching record of the updated video by the user.

In a possible implementation, the video information includes at least one of the following: an episode number of the updated video, and a synopsis of the updated video.

In a possible implementation, a plurality of posters are obtained from the server, and in this case, during the generating a wallpaper based on the poster, the program instructions enable the terminal to perform the following step: generating a plurality of wallpapers based on the plurality of posters, where the plurality of posters belong to a same updated video, or the plurality of posters belong to different updated videos.

In a possible implementation, during the displaying the wallpaper, the program instructions enable the terminal to perform the following step:

dynamically displaying the plurality of wallpapers at a set time interval.

In a possible implementation, before the displaying the wallpaper, the program instructions enable the terminal to perform the following step: determining that a preset condition is met.

In a possible implementation, the preset display condition includes at least one of the following: A screen of the terminal is locked, a preset time point is reached, or the terminal is in a standby mode.

In a possible implementation, the poster of the updated video is related to updated content.

In a possible implementation, the program instructions further enable the terminal to perform the following steps: receiving an operation instruction of the user to the wallpaper, where the instruction is used to instruct to play the updated video; and jumping to a playback page of the updated video based on the instruction.

According to a third aspect, an embodiment of this application provides a computer-readable medium, configured to store a computer program, where the computer program includes instructions used to perform the method according to any one of the first aspect or the possible implementations of the first aspect.

According to a fourth aspect, an embodiment of this application provides a computer program, where the computer program includes instructions used to perform the method according to any one of the first aspect or the possible implementations of the first aspect.

According to a fifth aspect, an embodiment of this application provides a chip. The chip includes a processing circuit and a transceiver pin. The transceiver pin and the processing circuit communicate with each other by using an internal connection path. The processing circuit performs the method according to any one of the first aspect or the possible implementations of the first aspect, to control a receive pin to receive a signal and a transmit pin to send a signal.

According to a sixth aspect, an embodiment of this application provides a system. The system includes the terminal and the server in the second aspect.

DETAILED DESCRIPTION OF EMBODIMENTS

The following clearly and completely describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

Figure 1:
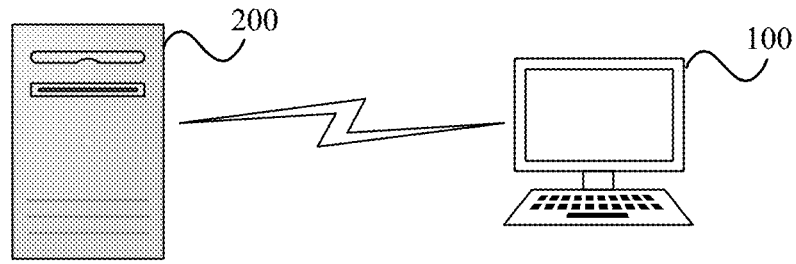
FIG. 1 is a schematic diagram of an application scenario according to an embodiment of this application.

Before the technical solutions in the embodiments of this application are described, an application scenario of the embodiments of this application is first described with reference to the accompanying drawings. FIG. 1 is a schematic diagram of an application scenario according to an embodiment of this application. A terminal 100 and a server 200 are included in this application scenario. In a specific implementation process of this embodiment of this application, the terminal 100 may be a computer, a smartphone, a smart TV, a tablet, or the like. It should be noted that, during actual application, there may be one or more servers and terminals, and the quantities of the server and the terminal in the application scenario shown in FIG. 1 are merely an example of adaptability. This is not limited in this application.

Specifically, in this embodiment of this application, a user may follow a video of interest according to a requirement. When the video followed by the user has an update, the terminal may push the update to increase an exposure degree of an updated video. In this embodiment of this application, the terminal may implement pushing of the updated video in combination with a wallpaper, thereby increasing an exposure entry of the video, instead of being limited to pushing in an application, and further providing a perfect updated video push mode. Optionally, if there is an updated video in one directory or one of a plurality of video directories followed by the user, a specific push mode of the updated video may refer to Scenario 1. Optionally, if two or more of a plurality of video directories followed by the user has updated videos, a specific push mode of the updated videos may refer to Scenario 2. It should be noted that the video directory described in this application may also be referred to as a video folder, a classification directory, a video collection, or the like, and is used to indicate a classified drama collection to which a video, a star, or the like of interest to the user belongs. For example, the video directory may refer to a specific television drama, concert videos of a star, or the like.

A specific implementation solution of this application is described below with reference to the schematic diagram of the application scenario shown in FIG. 1.

Scenario 1. There is an updated video in one directory or one of a plurality of video directories followed by the user.

Figure 2:
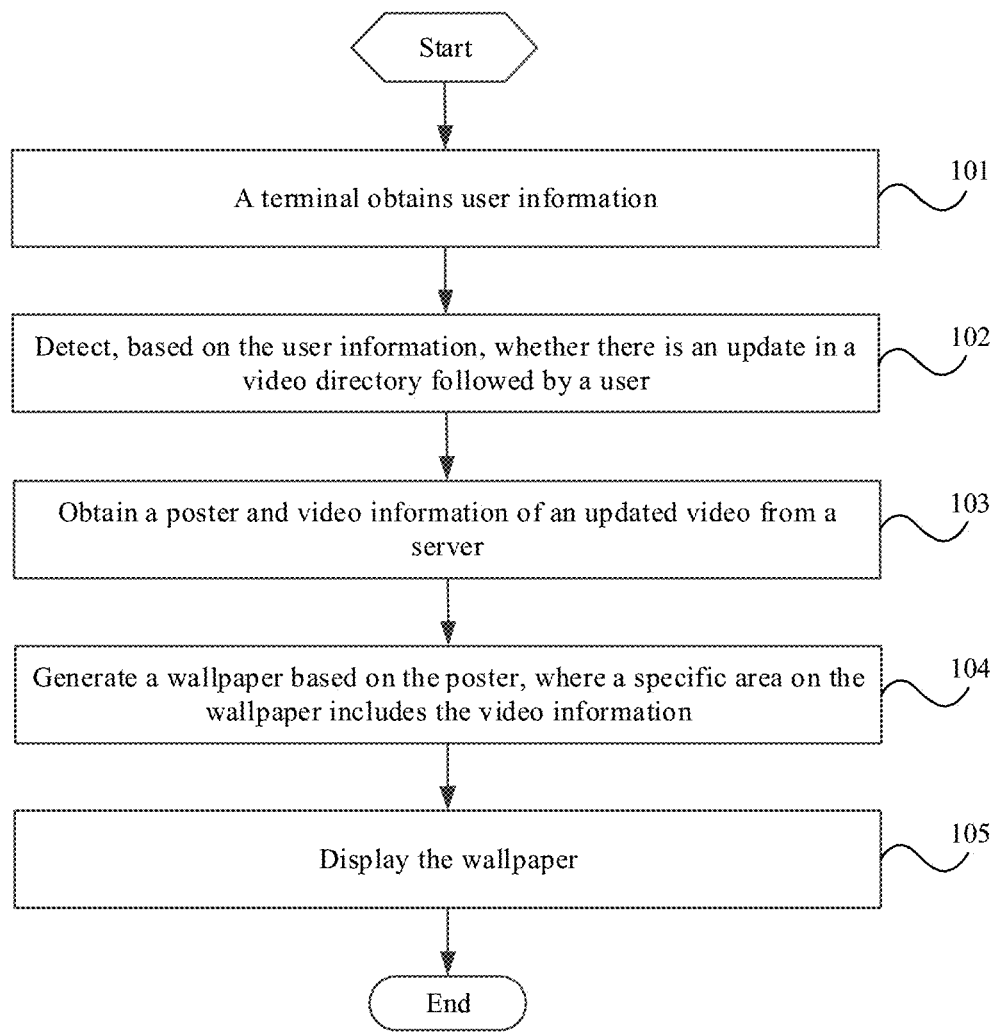
FIG. 2 is a schematic flowchart of a video update push method according to an embodiment of this application.

With reference to FIG. 1, FIG. 2 is a schematic flowchart of a video update push method according to an embodiment of this application. In FIG. 2:

Step 101: The terminal obtains user information.

Specifically, in this embodiment of this application, the terminal may obtain the user information to determine whether there is an update in the video directory followed by the user. Optionally, in this embodiment of this application, a manner in which the terminal obtains the user information includes but is not limited to:

(1) The terminal may invoke locally stored information about a primary user.

Optionally, the information about the primary user is stored in an account application, and video applications share the primary user, or an account of each application is associated with the primary user.

(2) The terminal may invoke user information of each video application.

Optionally, in the first manner, applications in the terminal (including the video applications and other applications) may share the primary user, or an account number (or user) of each application is associated with the primary user, namely, an account number used to log in to the terminal. Therefore, after obtaining the primary user information, the terminal can obtain, through querying, related information of applications under the primary user, or user information of a user associated with the primary user. Optionally, for example, the terminal may invoke a login status (Iflogin) interface of the account application, to detect whether the user has logged in, and invoke the user information stored in the account application through a user information (Userinfo) interface of the account application if it is detected that the user has logged in. Optionally, the user information may be identification information of the user, for example, a user identifier (UserID).

Optionally, in the second manner, the terminal may invoke the user information of each video application. Optionally, the user information of each video application may be centrally stored in the account application, or may be stored in a directory corresponding to each video application. This is not limited in this application.

Step 102: Detect, based on the user information, whether there is an update in the video directory followed by the user.

Optionally, in this embodiment of this application, the terminal may request, from the server, information such as a quantity of videos (or a quantity of episodes of the videos) included in the video directory followed by the user, and compare the obtained quantity of videos with a locally recorded quantity of videos obtained last time (the terminal only caches information of the quantity of videos but does not cache the videos to reduce a cache of the terminal), to determine whether there is an updated video. If there is an updated video, the process proceeds to step 103.

Specifically, the terminal may send a request to the server, and the request carries the user information obtained in step 101, to indicate the server to return the information of the video directory followed by the user. The information includes but is not limited to: identification information of the video directory (for example, a television drama) and the quantity of videos included in the video directory. The identification information of the video directory may be video on demand identifier (Video on Demand identifier, VodID).

In an example, the terminal sends the request carrying the user information, and the server may determine, based on the user information, that the user follows a television drama A, and obtain the identification information VodID 1 of the television drama A. The server may query a quantity of videos (or may be understood as a quantity of episodes currently included in the television drama A) included in a directory (or a specified storage location, for example, a folder) corresponding to the VodID 1 and return the quantity of videos to the terminal. Next, the terminal receives the identification information VodID 1 of the television drama A and a quantity of videos corresponding to the identification information. The terminal may search for, based on the VodID 1, a previously obtained quantity of videos included in the video directory corresponding to the VodID 1. Optionally, the previously obtained quantity of videos may be cached locally. Then, the terminal may compare the obtained quantity of videos with the previously obtained quantity of videos in the video directory, and if the newly obtained quantity of videos is greater than the previously obtained quantity of videos, the terminal may determine that there is an updated video in the video directory. For example, the terminal may obtain, from the server, that the quantity of episodes of the videos of the television drama A is 8, and then the terminal may retrieve the previously obtained quantity of episodes of the videos of the television drama A from a local cache, for example, the previously obtained quantity of episodes of the videos of the television drama A is 7. In this case, the terminal may determine that the television drama A has one episode updated. Optionally, after determining that there is an update in the video directory, the terminal may obtain identification information of the updated video for subsequent operations such as requesting a poster and video information of the updated video. Optionally, the identification information of the updated video may be a single episode identifier (VolumID).

Optionally, the terminal may determine whether there is an update in the video directory by comparing identification information of videos in addition to determining, based on the quantity of videos, whether there is an updated video. Specifically, the terminal may obtain identification information of one or more videos included in the video directory from the server. Next, the terminal may compare the obtained identification information with previously obtained identification information, to determine whether there is an update. For example, the terminal obtains, from the server, identification information of each video included in a television drama B. For example, the television drama B includes an episode 1, an episode 2, and an episode 3 with identification information respectively being Volum 1, Volum 2, and Volum 3. The terminal extracts previously obtained identification information of each video of the television drama B from the local cache, for example, including Volum 1 and Volum 2. In this case, the terminal may determine that the television drama B has one episode updated, namely, an episode corresponding to Volum 3.

Optionally, the previously obtained quantity of videos or the previously obtained identification information of the videos included in the video directory, as mentioned above, may not be cached locally in the terminal, but may be cached in the server. Specifically, the terminal may record only a time point of a previous request. Correspondingly, the terminal may request, from the server, a quantity of videos or identification information of the videos included in the video directory stored in the server at the time point of the previous request. Then, the terminal may obtain, from the server, quantities of videos or identification information of the videos included in the video directory of two requests (including a current request and the previous request), and determine whether there is an updated video. For example, the terminal requests, from the server at 18:00, a quantity of videos included in the video directory at the current time, where the time point of the previous request is 8:00. In this case, a request sent by the terminal at 18:00 further carries an instruction used to instruct the server to return a quantity of videos included in the video directory at the time point 8:00. Then, the terminal may obtain the quantities of videos included in the video directory, which correspond to the two time points (8:00 and 18:00) and are sent by the server, and the terminal compares the quantities of videos, to determine whether there is an updated video in the video directory.

Optionally, the terminal may further send a query request to the server. The query request may carry the user information, and may be used to indicate the server to return a video update status to the terminal when the server obtains, through querying, that there is an updated video in the video directory of interest to the user. That is, an action of querying whether there is an updated video may be performed by the server, thereby reducing cache occupation on the terminal.

Optionally, the terminal may periodically detect whether there is an updated video in the video directory. Period duration may be set according to an actual requirement, which is not limited in this application. For example, the terminal may separately detect whether there is an updated video in the video directory at 8:00 a.m. and 4:00 p.m. every day.

Optionally, in the foregoing steps, the server needs to obtain, based on the user information, the quantity of episodes of the television drama followed by the user, and feed the quantity of episodes back to the terminal. The server needs to determine a video directory (for example, a television drama) of interest to the user or specific video directories followed by the user. Optionally, in this embodiment of this application, a method for determining whether the user is interested in a video directory may be determining whether the user is interested in the video directory through an operation of the user on a video. Optionally, the operation of the user on a video may include but is not limited to subscribing the video, adding the video to favorites, downloading the video, or the like. In other words, when the user subscribes a video, adds the video to favorites, downloads the video, or the like, the terminal may determine that the user is interested in the video and a video directory to which the video belongs. The video directory refers to a television drama or a category to which the video belongs.

Figure 3:
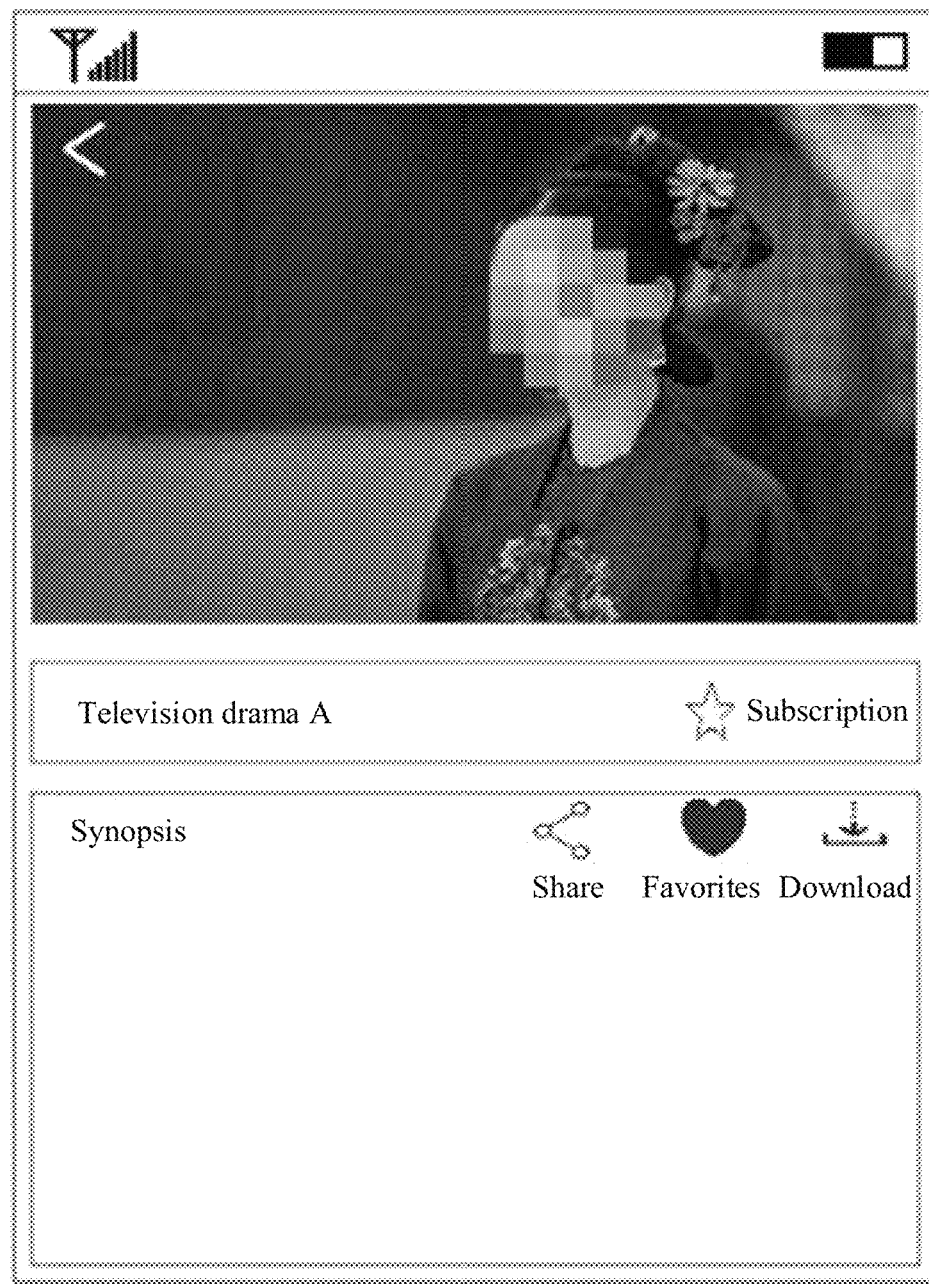
FIG. 3 is a schematic diagram of a playback page according to an embodiment of this application.

In an example, FIG. 3 shows a playback page of a video, and the playback page includes a subscription option, a favorites option, download option, and/or the like. It should be noted that a subscription operation may refer to follow a publisher to which the video belongs, that is, the user is interested in video content (or a video directory) released by the publisher. Correspondingly, after the user follows the publisher, the technical solution in this embodiment of this application may implement pushing an updated video of the publisher. Optionally, the subscription operation may refer to following a television drama to which a video belongs (a star, a sports event, or the like). For example, as shown in FIG. 3, the subscription operation is a subscription to the television drama to which the video belongs in a current playback page. Alternatively, the subscription operation may refer to following content of a sports event. Correspondingly, after the user subscribes to the sports event, the technical solution in this embodiment of this application may implement pushing of an updated sports event video in the sports event. Optionally, the subscription operation may be following a video directory to which a star belongs. Correspondingly, the technical solution in this embodiment of this application may implement pushing of a new movie, a television drama, and another video of the star.

Optionally, a favorites operation may refer to adding the video played in the current playback page to the favorites. Correspondingly, in the technical solution in this embodiment of this application, an updated video in a video directory to which a video in the favorites belongs may be pushed. For example, as shown in FIG. 3, if the user adds the currently played video to the favorites, it may be determined that the user is interested in a video directory to which the video belongs. For example, if the video is one episode of a television drama, it may be determined that the user is interested in the television drama. Alternatively, if the video is a basketball sports event, it may be determined that the user is interested in the basketball sports event. A downloading operation is similar to the favorites operation, to be specific, the user downloads a video, it may be determined that the user is interested in content of the video or interested in a video directory to which the video belongs.

The foregoing actions of querying whether the user follows a video directory are all performed by the server. In an example, the actions of querying whether the user follows a video directory may alternatively be performed by the terminal. For example, if the user adds an episode 10 of the television drama A into the favorites, and the terminal may determine, based on an action of adding the television drama A into the favorites, that the user is interested in the television drama A. Then, the terminal may store the user information corresponding to the identification information (for example, VodID) of the television drama A. Correspondingly, at a triggering moment of a detection period, the terminal may invoke the user information, query, based on the user information, that the user follows the television drama A, and obtain the identification information of the television drama A. Then, the terminal requests, based on the identification information and/or the user information, information such as episodes included in the television drama A from the server.

Optionally, in this embodiment of this application, the user may be interested in one video directory or a plurality of video directories. In this embodiment, an example in which there is an update in one video directory or one of a plurality of video directories followed by the user is used for description in detail. For example, the user adds the television drama A and the television drama B to the favorites during watching. The terminal and/or server may then determine, based on the user information, that the user is interested in the television drama A and the television drama B. In an example, only the television drama A has an updated video when the terminal detects whether there is an update in the video directory.

Optionally, in this embodiment of this application, there may be one or more updated videos in the video directory of interest to the user. For example, the terminal determines, based on the user information, that the user is interested in the television drama A and the television drama B, and the terminal may further obtain that there are two updated episodes of the television drama A, namely, episodes 22 and 23, and that there is no update in the television drama B.

Optionally, in this embodiment of this application, the terminal may further detect whether an updated video is a video not watched by the user. Optionally, the terminal may determine whether an updated video is not watched by querying a watching record (or may be referred to as a history record) of the user, to implement pushing of an updated video that has not been watched. Optionally, the terminal may request, from the server, a watching record of the video directory by the user, where identification information of a video may be recorded in the watching record. Then, the terminal may match identification information of an updated video with the identification information in the watching record, where a video that is successfully matched is a video that has been watched, and a video that fails in matching is a video that has not been watched. Optionally, in this embodiment of this application, the terminal may request the server to perform the foregoing operation, that is, the server may query whether the updated video has been watched.

Step 103: Obtain the poster and the video information of the updated video from the server.

Optionally, the terminal may request the poster and the video information of the updated video from the server. Specifically, the terminal sends a request carrying the identification information of the updated video to the server, and correspondingly, the server may locally search for a corresponding poster and corresponding video information based on the identification information.

Optionally, in this embodiment of this application, the updated video may correspond to one or more posters, in other words, the server may generate one or more posters corresponding to one video. Correspondingly, the terminal may obtain one or more posters of the updated video from the server.

Optionally, the poster described in this application may be a picture for describing content of the updated video, in other words, the poster may be an episode poster, that is, each episode of video corresponds to a picture for describing content of this episode. Optionally, the poster may be a screenshot of one or more frames of the updated video. Optionally, the poster may be a unified propaganda poster of a video directory to which the video belongs. For example, if video content of interest to the user is a sports star, the poster may be a picture of the sports star; if the video content of interest to the user is a television drama, the poster may be a single episode poster of an updated episode, a propaganda poster of the television drama, or a screenshot of any frame of the updated episode. This is not limited in this application.

Optionally, as described above, a same video directory may include a plurality of updated videos, for example, the television drama A has two episodes of updated videos. In an example, the terminal may obtain a plurality of posters, and the plurality of posters are in one-to-one correspondence with the plurality of updated videos. For example, the terminal determines that the television drama A has two updated episodes, namely, an episode 22 and an episode 23, and then the terminal may obtain an episode poster and video information of the episode 22 and an episode poster and video information of the episode 23 from the server. Certainly, the plurality of posters are not in one-to-one correspondence with the plurality of updated videos, for example, the terminal obtains at least two episode posters of the episode 22 and at least one episode poster of the episode 23 from the server. In another example, if the poster is a unified propaganda corresponding to the video directory, the terminal obtains only one poster for a scenario in which there are a plurality of updated videos. For example, the terminal determines that the television drama A has two updated episodes (the episode 22 and the episode 23), and the terminal may obtain a propaganda poster of the television drama A from the server, and optionally, the terminal may further obtain video information of episode 22 and the episode 23.

Optionally, video information of a video includes but is not limited to at least one of the following: brief introduction information of the video (or may be referred to as synopsis information), episode number information of the video, and the like. The brief introduction information is used to briefly introduce the content of the updated video, to increase an exposure degree. The episode number information refers to an episode number of the updated video, for example, the updated video is a third episode, so that the user can obtain accurate information of the updated video.

Optionally, the poster may be stored in a screenshot directory. Optionally, the video information may be stored in a brief introduction directory. Accordingly, the terminal and/or the server may obtain a corresponding poster in the screenshot directory. In addition, corresponding video information (including information such as a brief introduction and an episode number) may be obtained from the brief introduction directory.

Step 104: Generate a wallpaper based on the poster, where a specific area on the wallpaper includes the video information.

Specifically, the terminal may generate the wallpaper based on the obtained poster and video information. The video information may be included in a target area of the wallpaper. A size and a position of the target area can be adjusted by the user based on an actual situation. This is not limited in this application. Optionally, the terminal may obtain a plurality of posters. In an example, the plurality of posters may correspond to a same updated video. In another example, the plurality of posters may correspond to a plurality of updated videos. Accordingly, the terminal may generate a plurality of wallpapers based on the plurality of posters. Optionally, if the plurality of posters correspond to the same updated video, specific areas on the plurality of generated wallpapers may include same or different video information. Optionally, if a plurality of videos correspond to a same poster, for example, the television drama A has two updated episodes, the terminal obtains the propaganda poster of the television drama A from the server, that is, the two episodes of updated videos obtained by the terminal correspond to a same poster. Optionally, the specific area on the generated wallpaper may include video information corresponding to each updated video, or may include only the brief introduction information of the television drama A.

Figure 4A:
FIG. 4a is a schematic diagram of a wallpaper according to an embodiment of this application.

In an example, if a television drama of interest to the user has one updated video, the wallpaper generated after the terminal obtains the poster and video information of the updated video may be as shown in FIG. 4a. Refer to FIG. 4a. FIG. 4a is an episode poster corresponding to an updated video of the episode 22 of the television drama A, and a block part in the figure is the specific area for displaying obtained information such as a synopsis and a corresponding episode number.

Figure 4B:
FIG. 4b is a schematic diagram of a wallpaper according to an embodiment of this application.

In another example, if there are a plurality of updated videos in a television drama of interest to the user, the terminal generates a plurality of wallpapers after obtaining a plurality of posters and a plurality of pieces of video information. For example, the television drama A has two episodes of updated videos, namely, the episode 22 and the episode 23. The terminal obtains a poster and video information of the episode 22 and generate a wallpaper as shown in FIG. 4a, where the specific area includes the video information (including a brief introduction and an episode number) of content of the video of the episode 22. In addition, the terminal obtains a poster and video information of the episode 23 and generates a wallpaper as shown in FIG. 4b, where the specific area includes the video information (including a brief introduction and an episode number) of content of the video of the episode 23.

Step 105: Display the wallpaper.

Optionally, the terminal may display the generated wallpaper. Optionally, the user may preset a display condition of the wallpaper, or the display condition may be set by default in the terminal. The display condition may be a lock screen mode, to be specific, the wallpaper is displayed after the terminal enters the lock screen mode. The display condition may be periodically displaying the wallpaper. For example, the wallpaper described in this application is displayed every one hour, and display duration may be 20 minutes. Optionally, the display condition may be a predetermined time point or a predetermined time period. For example, the terminal may predetermine a peak time period in which the user uses the device, display the wallpaper in the peak time period, and display another wallpaper such as a system wallpaper in another time period, thereby improving a discovery probability of an update push. Optionally, the display condition may be a standby mode, to be specific, the terminal is not operated for a long time, and the display condition is triggered after the terminal enters the standby mode. For example, if the terminal is a smart TV, when the smart TV is not operated for a long time and enters the standby state, the terminal may invoke the generated wallpaper and set the wallpaper as a wallpaper of a standby interface. Optionally, the display condition may be that a specified application is started. For example, when a music application is started, the terminal may invoke the generated wallpaper as a background wallpaper when the user listens to music. The display condition of the wallpaper can be set based on an actual situation. This is not limited in this application.

Optionally, each time the wallpaper is displayed, the wallpaper may be displayed statically or dynamically. For example, a size of the wallpaper is smaller than a size of a screen of the terminal, so that the wallpaper can be moved on the screen.

Figure 5:
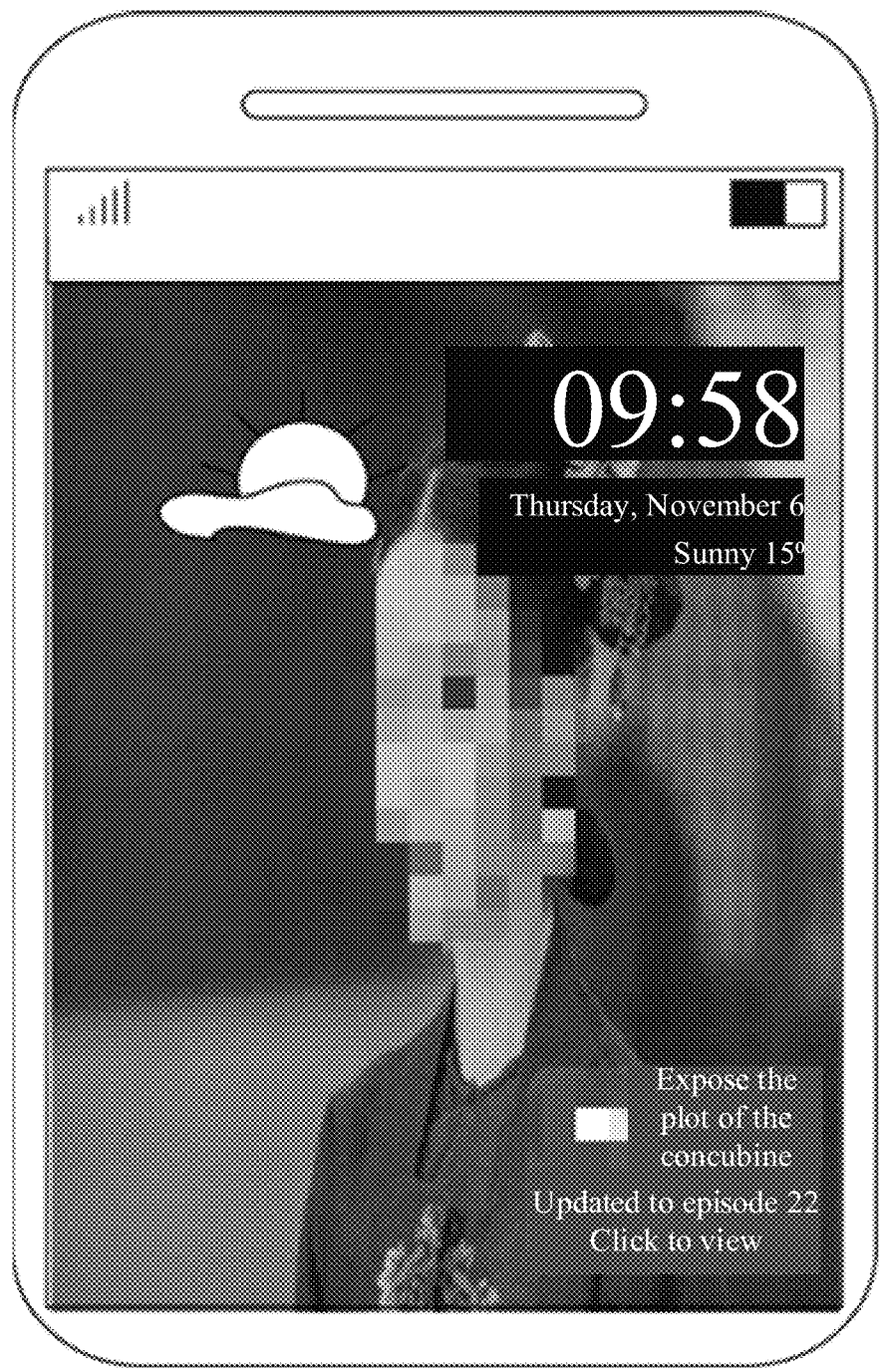
FIG. 5 is a schematic diagram of a wallpaper according to an embodiment of this application.
Figure 6:
FIG. 6 is a schematic diagram of a wallpaper according to an embodiment of this application.
Figure 7:
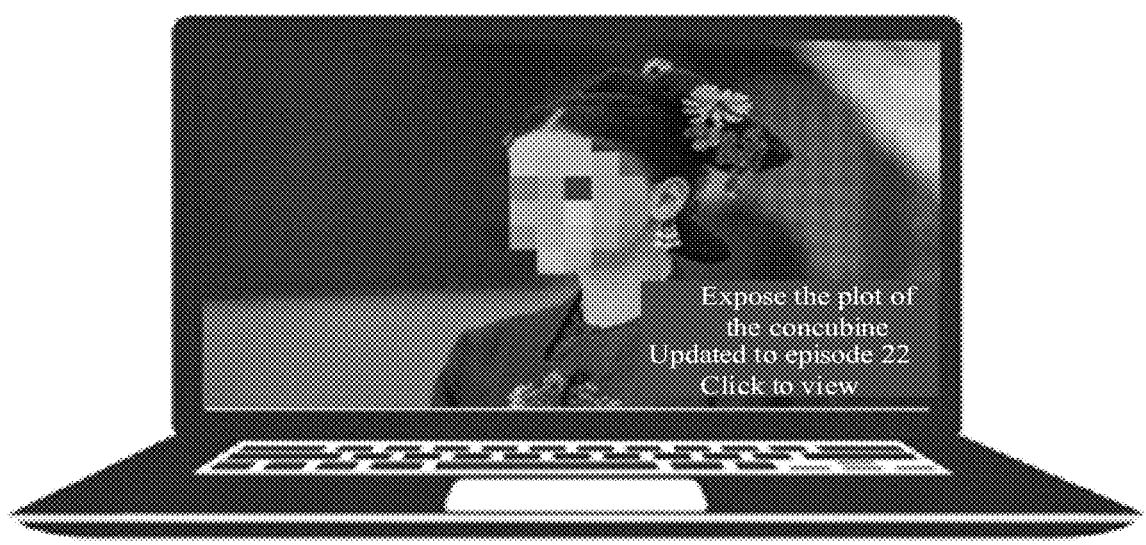
FIG. 7 is a schematic diagram of a wallpaper according to an embodiment of this application.

Optionally, the wallpaper described in this application may be a wallpaper of a lock screen interface of a smartphone or a tablet, or a wallpaper of a home page, for example, as shown in FIG. 5. Optionally, the wallpaper may be a picture displayed on a standby interface of a smart TV, as shown in FIG. 6. Optionally, the wallpaper may be a desktop wallpaper of a computer, or a screen saver wallpaper, as shown in FIG. 7. This is not limited in this application.

Optionally, as described in step 103, if the terminal obtains a plurality of posters. Correspondingly, in step 104, the terminal may generate a plurality of wallpapers based on the plurality of posters, and the plurality of wallpapers are in one-to-one correspondence with the plurality of posters; and in step 105, the terminal may dynamically display the plurality of generated wallpapers.

Optionally, the terminal may establish a wallpaper directory in which the plurality of generated wallpapers may be stored, that is, the wallpaper directory includes wallpapers corresponding to a plurality of updated videos. For example, the wallpaper directory may include the wallpapers shown in FIG. 4a and FIG. 4b.

Optionally, the terminal may set a time interval to dynamically display the plurality of wallpapers in the wallpaper directory. For example, if the terminal is a computer, the wallpapers shown in FIG. 4a and FIG. 4b may be displayed on a desktop of the computer in a polling manner. Display duration of each wallpaper can be set based on an actual situation. This is not limited in this application.

Optionally, in this embodiment of this application, the terminal may receive an operation instruction of the user to the wallpaper. The instruction is used to instruct the terminal to jump from a currently displayed wallpaper to a corresponding updated video. Optionally, the instruction may be triggered, by the user, by clicking the specific area on the wallpaper with a mouse, performing a touch operation, performing a remote control operation, or the like. The terminal may perform a page jump operation based on the instruction. Optionally, a step of page jumping may include: The terminal may obtain a link of a video corresponding to the currently displayed wallpaper, and enter a playback page of the video by invoking the link. Optionally, the terminal may obtain a link of the playback page of the video in such a manner that the terminal obtains identification information (for example, VolumID) of the video and identification information (for example, VodID) of a video directory (for example, a drama) to which the video belongs, and generates a link address based on the foregoing parameters, where the link address points to the playback page to which the video belongs, for example, the playback page shown in FIG. 3. For specific generation details of the link address, refer to the conventional technology, and details are not described herein again.

In conclusion, in the technical solution of this embodiment of this application, a poster of a video of interest to the user is used as a wallpaper, so that content of the wallpaper can be enriched. In addition, in this application, information such as a brief introduction of a video and an episode number is displayed on a wallpaper, so that an exposure entry of updated content can be increased, an opportunity for the user to discover the updated content is increased, and another information entry is not occupied.

Scenario 2: There are updated videos in two or more of a plurality of video directories followed by the user.

Figure 8:
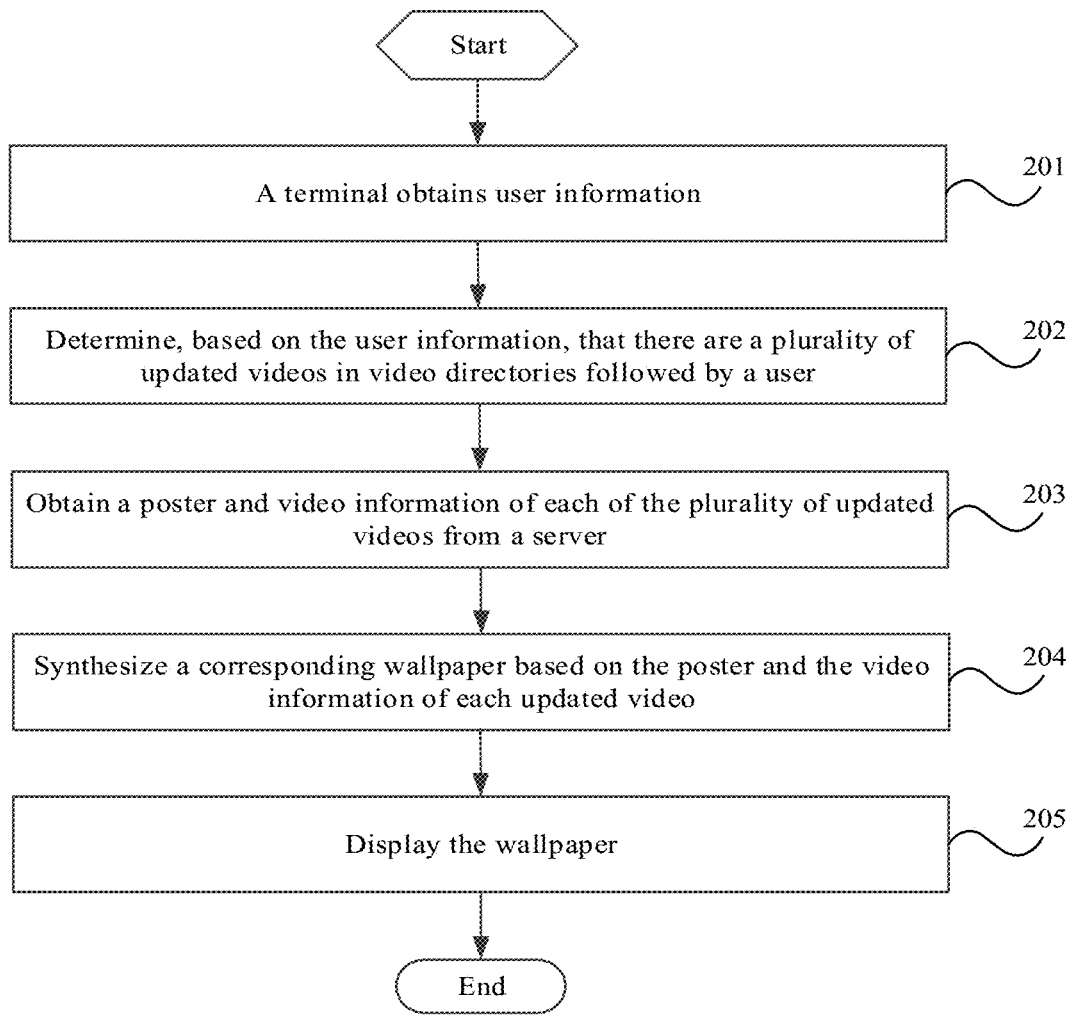
FIG. 8 is a schematic flowchart of a video update push method according to an embodiment of this application.

With reference to FIG. 1, FIG. 8 is a schematic flowchart of a video update push method according to an embodiment of this application. In FIG. 8:

Step 201: The terminal obtains user information.

For specific details, refer to step 101. Details are not described herein again.

Step 202: Determine, based on the user information, that there are updated videos in a plurality of video directories followed by the user.

Optionally, in this embodiment of this application, the terminal may determine, based on the user information, that the user follows a plurality of video directories. In addition, the terminal may further determine that there are updates in two or more of the plurality of video directories. There may be one or more updated videos in each video directory. For example, the terminal determines, based on the user information, that the user follows a television drama A, a television drama B, and a television drama C; further, the terminal obtains that the television drama A has two updated episodes, namely, an episode 22 and an episode 23, compared with a previous detection; the television drama B has no update; and the television drama C has two updated episodes, namely, an episode 5 and an episode 6, compared with the previous detection.

Optionally, the terminal may further determine, based on identification information (for example, VolumID) of each of the plurality of updated videos, whether a plurality of updated videos are unwatched videos, to implement pushing of updated and unwatched videos.

For update detection and other details, refer to step 102. Details are not described herein.

Step 203: Obtain a poster and video information of each of a plurality of updated videos from the server.

For specific details, refer to step 103. Details are not described herein again.

Step 204: Synthesize a corresponding wallpaper based on the poster and the video information of each updated video.

Step 205: Display the wallpaper.

Specifically, in this embodiment of this application, after obtaining the poster and the video information of each updated video, the terminal may generate the wallpaper corresponding to each updated video.

Figure 9A:
FIG. 9a is a schematic diagram of a wallpaper according to an embodiment of this application.
Figure 9B:
FIG. 9b is a schematic diagram of a wallpaper according to an embodiment of this application.

In an example, if a plurality of updated videos belong to different video directories, in other words, each of the plurality of video directories has an updated video, the terminal may generate a wallpaper corresponding to each updated video after obtaining a poster and video information of one or more updated videos of each video directory. For example, for wallpapers generated corresponding to the two updated episodes (the episode 22 and the episode 23) of the television drama A, refer to FIG. 4a and FIG. 4b. Wallpapers generated corresponding to the two episodes (the episode 5 and the episode 6) of the television drama C may be as shown in FIG. 9a and FIG. 9b, where a specific area on each wallpaper includes video information of the corresponding episode.

Optionally, the terminal may establish a wallpaper directory in which the plurality of generated wallpapers may be stored, that is, the wallpaper directory includes wallpapers corresponding to a plurality of updated videos. For example, the wallpaper directory may include the wallpapers shown in FIG. 4a, FIG. 4b, FIG. 9a, and FIG. 9b.

Optionally, in this embodiment of this application, the terminal may set a time interval for dynamically displaying the plurality of wallpapers in the wallpaper directory. For example, if the terminal is a computer, the wallpapers shown in FIG. 4a, FIG. 4b, FIG. 9a, and FIG. 9b may be displayed on a desktop of the computer in a polling manner. Display duration of each wallpaper can be set based on an actual situation. This is not limited in this application.

For other specific details, refer to step 105. Details are not described herein.

The foregoing mainly describes the solutions provided in the embodiments of this application from a perspective of interaction between network elements. It may be understood that, to implement the foregoing functions, the terminal includes a corresponding hardware structure and/or software module for performing the functions. A person skilled in the art should be easily aware that, in combination with the examples described in the embodiments disclosed in this specification, units, algorithms, and steps may be implemented by hardware or a combination of hardware and computer software in the embodiments of this application. Whether a specific function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the terminal may be divided into functional modules based on the foregoing method examples. For example, each functional module may be obtained through division corresponding to each function, or two or more functions may be integrated into one processing module. The integrated module may be implemented in a form of hardware, or may be implemented in a form of a software function module. It should be noted that, in this embodiment of this application, division into the modules is an example, and is merely a logical function division. In actual implementation, another division manner may be used.

Figure 10:
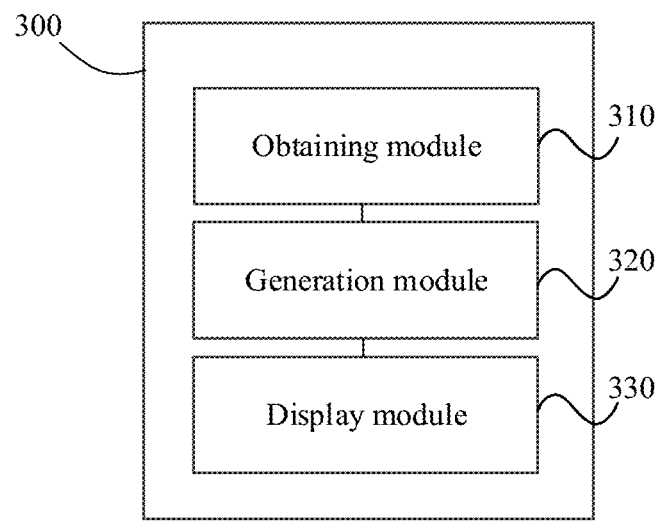
FIG. 10 is a schematic structural diagram of a terminal according to an embodiment of this application.

In a case in which each function module is obtained through division corresponding to each function, FIG. 10 is a schematic diagram of a possible structure of an apparatus 300 in the foregoing embodiment. The apparatus may be a terminal. As shown in FIG. 10, the apparatus may include an obtaining module 310, a generation module 320, and a display module 330. The obtaining module 310 may be used in the step of "obtaining a poster and video information of an updated video from a server". For example, the module may be configured to support the terminal to perform step 101, step 102, step 103, step 201, step 202, and step 203 in the method embodiment described above. The generation module 320 may be used in the step of "generating a wallpaper based on the poster, where a specific area on the wallpaper includes the video information". For example, the module may be configured to support the terminal to perform step 104 and step 204 in the method embodiment described above. The display module 330 may be used in the step of "displaying the wallpaper". For example, the module may be configured to support the terminal to perform step 105 and step 205 in the method embodiment described above.

Figure 11:
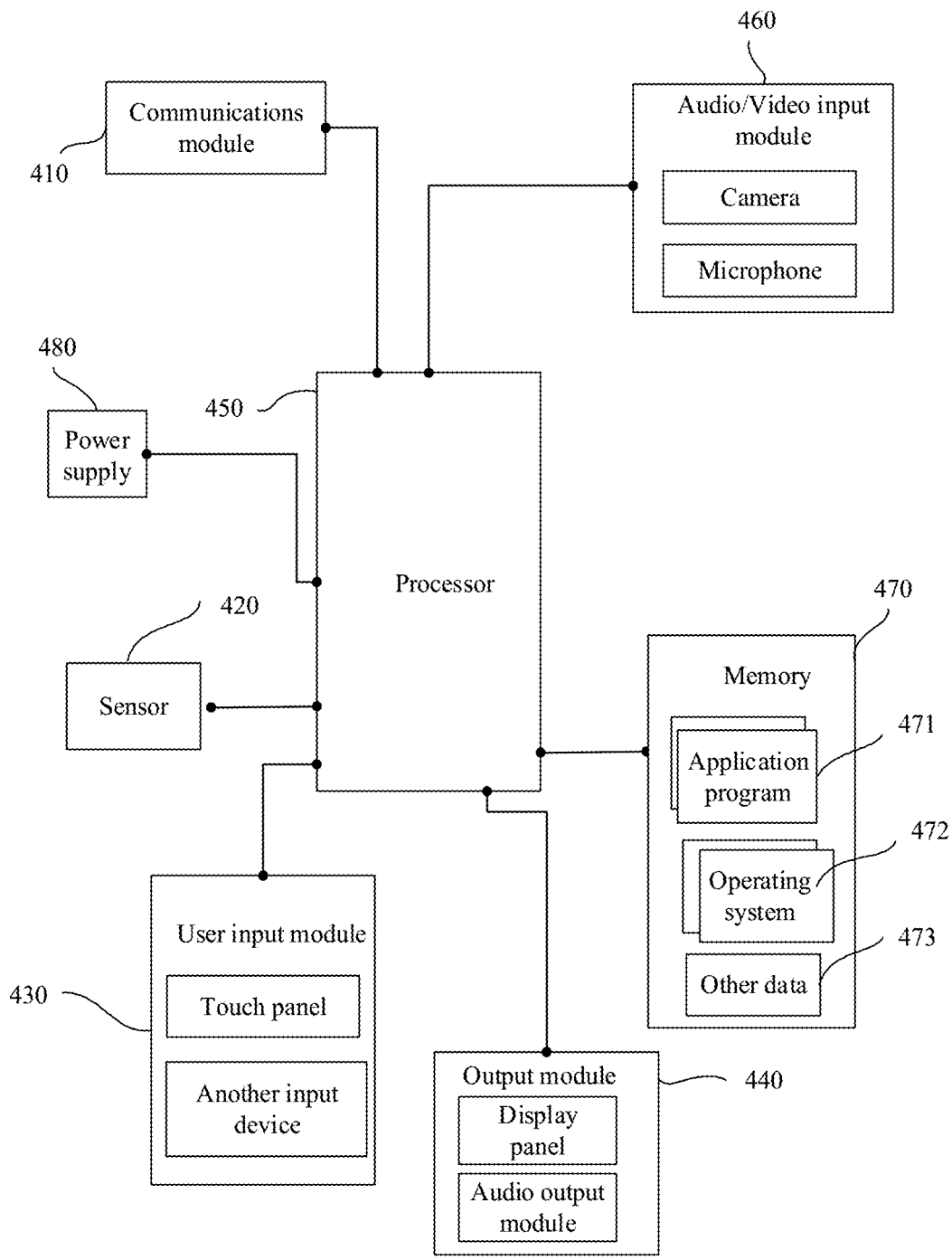
FIG. 11 is a schematic structural diagram of an apparatus according to an embodiment of this application.

In another example, FIG. 11 is a schematic diagram of an apparatus 400 according to an embodiment of this application. The apparatus may be a terminal. As shown in the figure, the apparatus includes a communication module 410, a sensor 420, a user input module 430, an output module 440, a processor 450, an audio/video input module 460, a memory 470, and a power supply 480.

The communications module 410 may include at least one module that can enable the computer system to communicate with a communications system or another computer system. For example, the communications module 410 may include one or more of a wired network interface, a broadcast receiving module, a mobile communications module, a wireless internet module, a local-area communications module, and a location (or positioning) information module. The plurality of modules each have a plurality of implementations in the prior art, and details are not described one by one in this application.

The sensor 420 can sense a current status of the system, for example, an open/closed state, a location, whether the system is in contact with a user, a direction, and acceleration/deceleration. In addition, the sensor 420 can generate a sensing signal used to control an operation of the system.

The user input module 430 is configured to: receive entered digital information or characteristic information, or a contact touch operation/contactless gesture, and receive signal input related to user settings and function control of the system, and the like. The user input module 430 includes a touch panel and/or another input device.

The output module 440 includes a display panel, and the display panel is configured to display information input by the user, information provided to the user or various menu interfaces of the system, the wallpaper described in this application, and the like. Optionally, the display panel may be configured in a form of a liquid crystal display (liquid crystal display, LCD), an organic light-emitting diode (organic light-emitting diode, OLED), or the like. In some other embodiments, the touch panel may cover the display panel to form a touch display screen. In addition, the output model 440 may further include an audio output model, an alarm, a tactile module, and the like.

The audio/video input module 460 is configured to input an audio signal or a video signal. The audio/video input module 460 may include a camera and a microphone.

The power supply 480 may receive external power and internal power under the control of the processor 450, and provide power required by operations of the components in the system.

The processor 450 may indicate one or more processors. For example, the processor 450 may include one or more central processing units, or include one central processing unit and one graphics processing unit, or include one application processing unit and one coprocessor (for example, a micro control unit or a neural network processor). When the processor 450 includes a plurality of processors, the plurality of processors may be integrated into a same chip, or may each be an independent chip. One processor may include one or more physical cores, where the physical core is a smallest processing module. The memory 470 stores a computer program, and the computer program includes an operating system program 472, an application program 471, and the like. For example, a typical operating system is a system used for a desktop computer or a notebook computer, such as Windows of Microsoft Corp. or MacOS of Apple Inc.; or a system used for a mobile terminal, such as a Linux®-based Android (Android®) system developed by Google Inc. The method provided in the foregoing embodiment may be implemented by software, and this may be considered as a specific implementation of the application program 471.

The memory 470 may be one or more of the following types: a flash (flash) memory, a hard disk-type memory, a micro multimedia card memory, a card memory (for example, an SD or XD memory), a random access memory (random access memory, RAM), a static random access memory (static RAM, SRAM), a read-only memory (read only memory, ROM), an electrically erasable programmable read-only memory (electrically erasable programmable read-only memory, EEPROM), a programmable read-only memory (programmable ROM, PROM), a magnetic memory, a magnetic disk, or an optical disc. In some other embodiments, the memory 470 may be alternatively a network storage device in the Internet. The system may perform an operation such as updating or reading on the memory 470 in the Internet.

The processor 450 is configured to: read the computer program from the memory 470, and then perform a method defined by the computer program. For example, the processor 450 reads the operating system program 472 to run an operating system in the system and implement various functions of the operating system, or reads one or more application programs 471 to run an application in the system.

The memory 470 also stores data 473 other than the computer program, such as a quantity of videos, wallpapers, and the like in this application.

A connection relationship among the modules in FIG. 11 is only an example. A method provided in any embodiment of this application may also be applied to a terminal device using another connection manner. For example, all modules are connected by using a bus.

All related content of the steps in the foregoing method embodiments may be cited in function descriptions of corresponding function modules. Details are not described herein again.

Based on a same technical concept, an embodiment of this application further provides a computer-readable storage medium. The computer-readable storage medium stores a computer program, the computer program includes at least one segment of code, and the at least one segment of code may be executed by a terminal, to control the terminal to implement the foregoing method embodiments.

Based on a same technical concept, an embodiment of this application further provides a computer program. When executed by a terminal, the computer program is used to implement the foregoing method embodiments.

The program may be all or partially stored in a storage medium encapsulated with a processor, or may be partially or all stored in a memory not encapsulated with a processor.

Based on a same technical concept, an embodiment of this application further provides a processor. The processor is configured to implement the foregoing method embodiments. The processor may be a chip.

Methods or algorithm steps described in combination with the content disclosed in this embodiment of this application may be implemented by hardware, or may be implemented by a processor by executing a software instruction. The software instruction may include a corresponding software module. The software module may be stored in a random access memory (Random Access Memory, RAM), a flash memory, a read-only memory (Read Only Memory, ROM), an erasable programmable read only memory (Erasable Programmable ROM, EPROM), an electrically erasable programmable read only memory (Electrically EPROM, EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in network equipment. Certainly, the processor and the storage medium may exist in network equipment as discrete components.

A person skilled in the art should be aware that in the foregoing one or more examples, functions described in the embodiments of this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium. The communication medium includes any medium that facilitates transmission of a computer program from one place to another. The storage medium may be any available medium accessible to a general-purpose computer or a dedicated computer.

It should be noted that, the term "and/or" in this specification describes only an association relationship for describing associated objects and represents that three relationships may exist. For example, A and/or B may represent the following three cases: Only A exists, both A and B exist, and only B exists.

In the embodiments of this application, the words "for example" or "by way of example" are used to represent an example, an illustration, or an explanation. Any embodiment or design scheme described as the word "example" or "for example" in the embodiments of this application should not be explained as being more preferred or having more advantages than another embodiment or design scheme. To be exact, the use of the words, such as "for example" or "by way of example" is intended to present relevant concepts in a specific manner.

In the description of the embodiments of this application, unless otherwise stated, "a plurality of" means two or more than two. For example, a plurality of videos refers to two or more than two videos.

The embodiments of this application are described above with reference to the accompanying drawings. However, this application is not limited to the foregoing specific implementations. The foregoing specific implementations are merely examples rather than limitations. A person of ordinary skill in the art, under the teachings of this application, can make many forms without departing from the protection scope of the purpose and claims of this application, which fall within the protection of this application.

What is claimed is:

1. A method implemented by a terminal, the method comprising:
   obtaining user information of a user;
   obtaining a quantity of videos included in a video directory and a last locally recorded quantity of videos at the terminal;
   detecting, using the user information and based on the quantity of videos and the last locally recorded quantity of videos, whether there is an updated video in a video directory followed by the user;
   obtaining, in response to detecting the updated video in the video directory followed by the user, a poster and video information of the updated video from a server;
   generating a wallpaper based on the poster, wherein a first area on the wallpaper comprises the video information; and
   displaying the wallpaper.

2. The method of claim 1, wherein before obtaining the poster and the video information, the method further comprises determining that watching record of the updated video by the user is not available.

3. The method of claim 1, wherein the video information comprises at least one of:
   an episode number of the updated video; or
   a synopsis of the updated video.

4. The method of claim 1, further comprising:
   obtaining a plurality of posters from the server, wherein the posters belong to the updated video, a second updated video, or to different updated videos; and
   generating a plurality of wallpapers based on the posters.

5. The method of claim 4, further comprising dynamically displaying the wallpapers at a set time interval.

6. The method of claim 1, wherein before displaying the wallpaper, the method further comprises determining that a preset display condition is met.

7. The method of claim 1, wherein the poster is related to an updated content.

8. The method of claim 1, further comprising:
   receiving an operation instruction of the user to the wallpaper, wherein the operation instruction instructs to play the updated video; and
   switching to a playback page of the updated video based on the operation instruction.

9. The method of claim 1, wherein the user information comprises a first account of the user and a second account of a video application, and wherein the first account of the user is associated with the second account of the video application.

10. A terminal comprising:
    a memory configured to store instructions; and
    one or more processors coupled to the memory and configured to execute the instructions to cause the terminal to:
    obtain user information;
    obtain a quantity of videos included in a video directory and a last locally recorded quantity of videos at the terminal;
    detect, using the user information and on based the quantity of videos and the last locally recorded quantity of videos, whether there is an update in a video directory followed by a user;
    obtain, in response to detecting an updated video in the video directory followed by the user based on the obtained user information, a poster and video information of the updated video from a server;
    generate a wallpaper based on the poster, wherein a first area on the wallpaper comprises the video information; and
    display the wallpaper.

11. The terminal of claim 10, wherein before obtaining the poster and the video information, the one or more processors are further configured to execute the instructions to cause the terminal to determine that watching record of the updated video by the user is not available.

12. The terminal of claim 10, wherein the video information comprises at least one of:
    an episode number of the updated video; or
    a synopsis of the updated video.

13. The terminal of claim 10, wherein the one or more processors are further configured to execute the instructions to cause the terminal to:
    obtain a plurality of posters from the server, wherein the posters belong to the same updated video, a same updated second video or to different updated videos; and
    generate a plurality of wallpapers based on the posters.

14. The terminal of claim 13, wherein the instructions further cause the terminal to dynamically display the wallpapers at a set time interval.

15. The terminal of claim 10, wherein before displaying the wallpaper, the one or more processors are further configured to execute the instructions to cause the terminal to determine that a preset display condition is met.

16. The terminal of claim 15, wherein the preset display condition comprises at least one of:
    a screen of the terminal is locked;
    a preset time point has been reached; or
    the terminal is in a standby mode.

17. The terminal of claim 10, wherein the poster is related to an updated content.

18. The terminal of claim 10, wherein the one or more processors are further configured to execute the instructions to cause the terminal to:

receive an operation instruction of the user to the wallpaper, wherein the operation instruction instructs to play the updated video; and switch to a playback page of the updated video based on the operation instruction.

19. The method of claim 6, wherein the preset display condition comprises that a preset time point has been reached or a terminal is in a standby mode.

20. A computer program product comprising computer-executable instructions that are stored on a non-transitory computer-readable medium and that, when executed by one or more processors, cause a terminal to:

obtain user information;

obtain a quantity of videos included in a video directory and a last locally recorded quantity of videos at the terminal;

detect, using the user information and based on the quantity of videos and the last locally recorded quantity of videos, whether there is an update in a video directory followed by a user;

obtain, in response to detecting an updated video in the video directory followed by the user based on the obtained user information, a poster and video information of the updated video from a server;

generate a wallpaper based on the poster, wherein a first area on the wallpaper comprises the video information; and display the wallpaper.

\* \* \* \* \*